United States Patent
Heise (10) Patent No.: US 9,490,508 B2
(45) Date of Patent: Nov. 8, 2016

(54) BATTERY ASSEMBLY HAVING A THERMAL MANAGEMENT SYSTEM

(75) Inventor: Axel Heise, Mainz (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 970 days.

(21) Appl. No.: 13/328,562

(22) Filed: Dec. 16, 2011

(65) Prior Publication Data

US 2013/0157101 A1  Jun. 20, 2013

(51) Int. Cl.
| | |
|---|---|
| *H01M 10/50* | (2006.01) |
| *H01M 10/6554* | (2014.01) |
| *H01M 10/6555* | (2014.01) |
| *H01M 10/647* | (2014.01) |

(52) U.S. Cl.
CPC ..... *H01M 10/6554* (2015.04); *H01M 10/6555* (2015.04); *H01M 10/647* (2015.04); *H01M 2220/20* (2013.01); *Y10T 29/4935* (2015.01); *Y10T 29/49826* (2015.01)

(58) Field of Classification Search
CPC .................................................. H01M 10/50
See application file for complete search history.

(56) References Cited

U.S. PATENT DOCUMENTS

2010/0297494 A1* 11/2010 Chen ............................ 429/179

FOREIGN PATENT DOCUMENTS

CN          1848518 A     10/2006

\* cited by examiner

*Primary Examiner* — Jacob Marks
(74) *Attorney, Agent, or Firm* — Fraser Clemens Martin & Miller LLC; James D. Miller (57) ABSTRACT

A battery assembly includes a plurality of battery cells disposed adjacent and in heat transfer relationship with a plurality of cooling modules. The cooling modules are directly affixed to or cause to abut at least one of a first thermally conductive base and a second thermally conductive base forming a thermal transfer path from the battery cells through the cooling modules to the at least one thermally conductive base.

20 Claims, 6 Drawing Sheets

BATTERY ASSEMBLY HAVING A THERMAL MANAGEMENT SYSTEM

FIELD OF THE INVENTION

The invention relates to battery systems, and more particularly to a battery assembly having an integrated thermal management system.

BACKGROUND OF THE INVENTION

The use of vehicles powered by internal combustion engines is common. However, it is well known that certain problems associated with the use of internal combustion engines such as fuel shortages, costs of operation, and the deleterious effect on the environment have led to the increased interest in and use of vehicles powered by electricity. A battery assembly is typically used to supply the electricity required for such purposes.

It is well known that heat is generated in battery cells when the battery assembly is being used, especially when the battery assembly is being aggressively charged or discharged. The generated heat must be removed and dissipated in order to improve a performance and extend a life of the battery assembly. Traditionally, airflow systems have been employed to dissipate the heat generated in the battery cells. However, typical airflow systems may not provide satisfactory thermal conduction from the interior of the battery cells. Additionally, it is well known that a size and a weight of the battery assembly are important considerations. And, airflow systems typically used to cool the battery assembly tend to occupy and require large amounts of space. Accordingly, a need exists to integrate system components of the battery assembly in order to minimize the size and the weight associated with the battery assembly.

In view of the foregoing, it should be appreciated that it would be desirable to provide a battery assembly having an integrated thermal management system which provides thermal conduction away from the interior of the battery cells, while minimizing space requirements and complexity of manufacture of the battery assembly.

SUMMARY OF THE INVENTION

In concordance and agreement with the present invention, a battery assembly having an integrated thermal management system which provides thermal conduction away from the interior of the battery cells, while minimizing space and complexity of manufacture of the battery assembly, has surprisingly been discovered.

In one embodiment, the battery assembly comprises: at least one thermally conductive base; a plurality of cooling modules directly abutting the at least one thermally conductive base, wherein at least one of the cooling modules includes a plurality of thermally conductive members; and at least one battery cell in heat transfer relationship with the cooling modules.

In another embodiment, the battery assembly comprises: a first thermally conductive base; a second thermally conductive base; a plurality of first cooling modules directly abutting the first thermally conductive base, wherein at least one of the first cooling modules includes a plurality of first thermally conductive members; a plurality of second cooling modules directly abutting the second thermally conductive base, wherein at least one of the second cooling modules includes a plurality of second thermally conductive members; and at least one battery cell disposed adjacent and in heat transfer relationship with the first and second cooling modules.

The invention also relates to a method assembling the battery assembly.

The method comprising the step of: disposing at least one battery cell adjacent and in heat transfer relationship with at least one of a plurality of cooling modules, wherein at least one of the cooling modules includes a plurality of thermally conductive members, and wherein the cooling modules are configured to be directly abutting at least one thermally conductive base.

BRIEF DESCRIPTION OF THE DRAWINGS

The above objects and advantages of the invention, as well as others, will become readily apparent to those skilled in the art from reading the following detailed description of a preferred embodiment of the invention when considered in the light of the accompanying drawings, in which.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
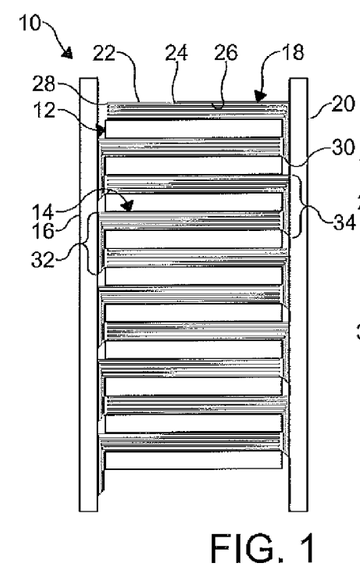
FIG. 1 is a schematic elevational view of a battery assembly according to an embodiment of the invention.

FIG. 1 shows a battery assembly 10 according to the present invention. The battery assembly 10 can be used in various configurations including, but not limited to, a horizontally or vertically stacked battery cell packaging configuration used in an automotive vehicle application. The battery assembly 10 shown includes a plurality of battery cells 12, a plurality of first cooling modules 14 coupled to a first thermally conductive base 16, and a plurality of second cooling modules 18 coupled to a second thermally conductive base 20. As a non-limiting example, the battery cells 12 may be prismatic lithium ion (Li-ion) battery cells. It should be appreciated that other battery cells, employing a different structure and electrochemistry, may also be used within the scope of the present invention.

Each of the battery cells 12 includes a plurality of battery components (not shown) co-acting between one another with electrolyte therebetween as known to those skilled in the lithium battery art. A first electrode is adjacent a first current collector and a second electrode of charge opposite the first electrode is adjacent a second current collector. A separator layer is positioned between the first and second electrodes with the first and second electrodes with electrolyte therebetween. A plurality of first electrodes and a plurality of second electrodes are stacked and packaged into an electrical insulating envelope to form the battery cells 12.

Alternately interposed between the battery cells 12 are the cooling modules 14, 18. Each of the cooling modules 14, 18 includes a plurality of thermally conductive members 22 in stacked relation. In certain embodiments, the cooling modules 14, 18 include five (5) of the thermally conductive members 22 having a thickness in a range of about 0.1 mm to about 0.5 mm and a length in a range of about 160 mm to about 180 mm. However, it is understood that the cooling modules 14, 18 can include any number of the thermally conductive members 22 of any size and shape as desired. The thermally conductive members 22 can be plates, sheets, or foils formed from a thermally conductive material such as aluminum, copper, and the like, without limiting the scope of the present invention.

Each of the thermally conductive members 22 includes a first thermal transfer face 24, an opposing second thermal transfer face 26, and terminal ends 28, 30. The first thermal transfer face 24 of each of the thermally conductive members 22 abuts the second thermal transfer face 26 of the adjacent thermally conductive member 22 or a face of one of the battery cells 12. The second thermal transfer face 26 of each of the thermally conductive members 22 abuts the first thermal transfer face 24 of the adjacent thermally conductive member 22 or a face of one of the battery cells 12. As shown, the ends 28 of the thermally conductive members 22 of each of the cooling modules 14 are bonded together forming a fin portion 32. The ends 30 of the thermally conductive members 22 of each of the cooling modules 18 are bonded together forming a fin portion 34. In certain embodiments, the ends 28, 30 of the thermally conductive members 22 are bonded together by a welding process such as a diffusion welding process, an ultrasonic welding process, and the like, for example. It is understood, however, that the ends 28, 30 of the thermally conductive members 22 can be bonded together by any suitable process such as brazing, soldering, riveting, clamping, use of an adhesive, and the like, for example.

The fin portions 32, 34 shown are bendable tabs extending beyond the battery cells 12. In certain embodiments, each of the fin portions 32, 34 is generally planar having a length in a range of about 10 mm to about 30 mm. It is understood that the fin portions 32, 34 can have any shape and size as desired such as pleated, for example. As shown, the fin portions 32, 34 are directly affixed to the thermally conductive bases 16, 20, respectively, to provide a thermal flow path from the battery cells 12 to the thermally conductive bases 16, 20 without any thermal interface resistance. It is understood that the fin portions 32, 34 can be affixed to the thermally conductive bases 16, 20 by any suitable process such as welding, brazing, soldering, riveting, clamping, use of an adhesive, and the like, for example. Each of the fin portions 32, 34 may also include at least one aperture formed therein to facilitate affixing to the thermally conductive bases 16, 20.

It is also understood that the fin portions 32, 34 can simply abut the thermally conductive bases 16, 20.

Figure 2A:
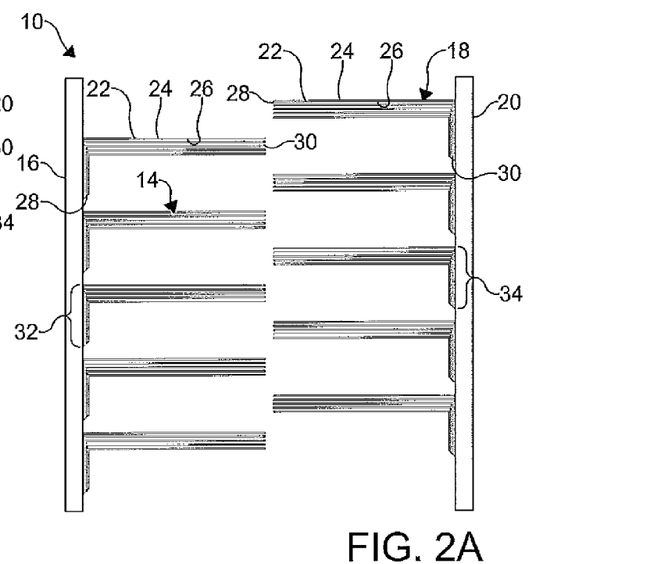
FIGS. 2A-2C are schematic elevational views depicting a method for assembling the battery assembly illustrated in FIG. 1.
Figure 2B:
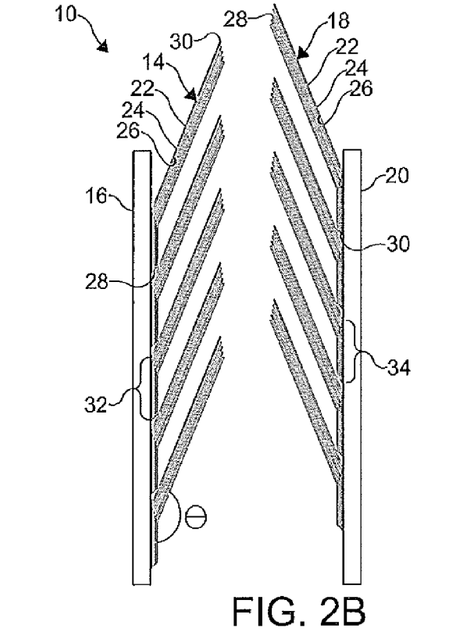
Figure 2C:
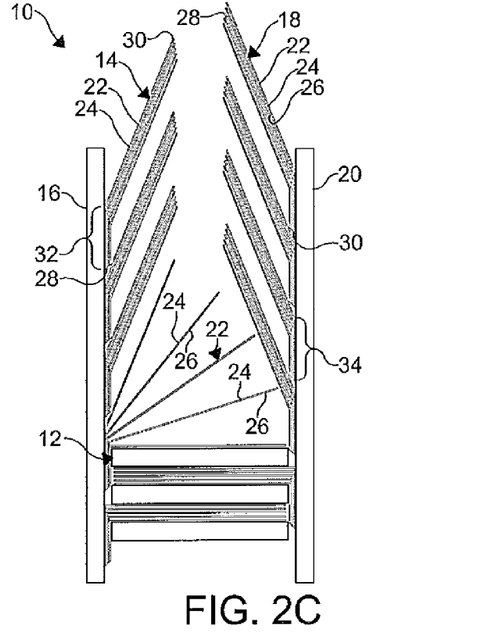
Figure 3A:
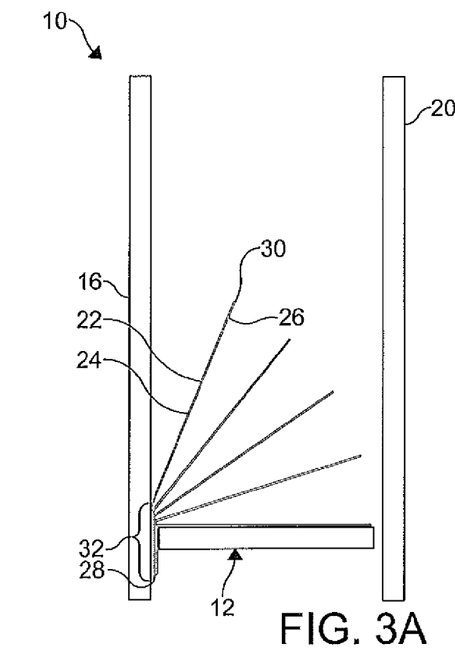
FIGS. 3A-3D are schematic elevational views depicting an alternate method for assembling the battery assembly illustrated in FIG. 1.
Figure 3B:
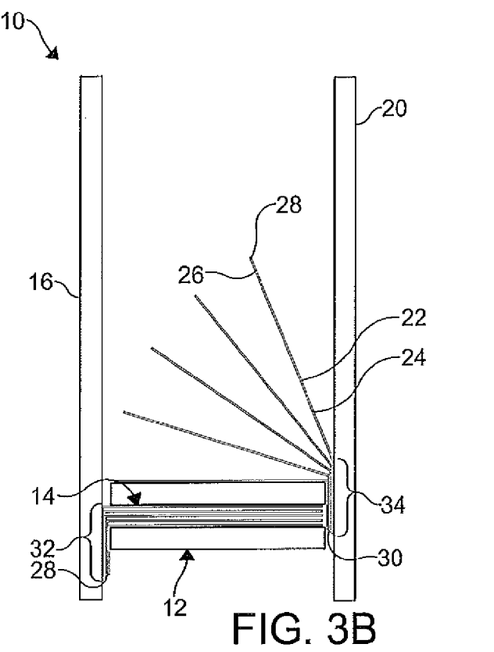
Figure 3C:
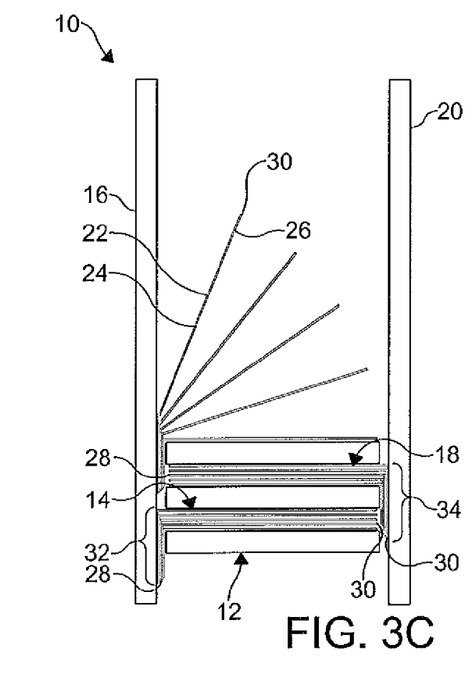
Figure 3D:
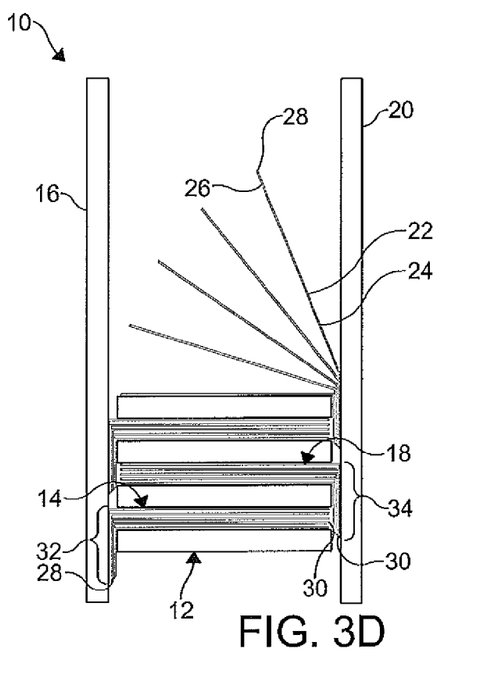

Referring to FIGS. 2A-2C, a method of assembling the battery assembly 10 is shown. The cooling modules 14, 18 are coupled to the respective thermally conductive bases 16, 20 in an alternating manner. In other words, the cooling module 14 is laterally offset with respect to the cooling module 18 as shown in FIG. 2A. As illustrated, the cooling modules 14, 18 are coupled to the thermally conductive bases 16, 20 by directly affixing the fin portions 32, 34 of the cooling modules 14, 18 thereto. Each of the cooling modules 14, 18 is spaced apart to permit the battery cells 12 to be disposed therebetween. Thereafter, as illustrated in FIG. 2B, the cooling modules 14, 18 are bent in a first direction towards the thermally conductive bases 16, 20. In certain embodiments, an angle Θ between the fin portions 32, 34 and the remaining portion of the cooling modules 14, 18, respectively, is greater than 90 degrees. The battery cells 12 are then disposed between and in heat transfer relationship with the alternating cooling modules 14, 18. As depicted in FIG. 2C, one of the battery cells 12 is disposed between the thermally conductive bases 16, 20. The adjacent cooling module 14 is then bent in a second direction away from the thermally conductive base 16 so that the angle Θ is about 90 degrees. Another one of the battery cells 12 is then disposed between the thermally conductive bases 16, 20. The adjacent cooling module 18 is then bent in a second direction away from the thermally conductive base 20 so that the angle Θ is about 90 degrees. Each of the battery cells 12 is disposed between the adjacent cooling modules 14, 18 until the battery assembly 10 is complete. It is understood that once the battery assembly 10 is assembled, the battery assembly 10 can then be placed into an enclosure or housing.

FIGS. 3A-3D show an alternate method of assembling the battery assembly 10 according to the present invention. The method shown in FIGS. 3A-3D is substantially similar to the method shown in FIGS. 2A-2C, except that the cooling modules 14, 18 shown in FIGS. 3A-3D are directly affixed to or caused to abut the thermally conductive bases 16, 20 as the battery assembly 10 is being assembled.

The inventive concept of the present invention provides advantages over the prior art. Heat transfer coefficients are improved over known structures due to the elimination of associated thermal interface material needed between a thermally conductive base and an assembly bracket, and between the assembly bracket and a cooling plate. A second advantage of the present invention is that the cooling modules 14, 18 are directly affixed to or abut the thermally conductive bases 16, 20, eliminating the need for the thermal interface material to satisfy the tolerances required during a manufacturing and assembling of the battery assembly 10.

Figure 4:
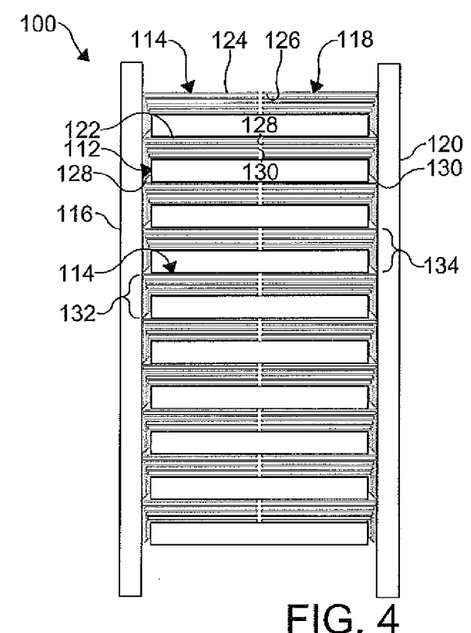
FIG. 4 is a schematic elevational view of a battery assembly according to another embodiment of the invention.

FIG. 4 shows a battery assembly 100 according to the present invention. The battery assembly 100 can be used in various configurations including, but not limited to, a horizontally or vertically stacked battery cell packaging configuration used in an automotive vehicle application. The battery assembly 100 shown includes a plurality of battery cells 112, a plurality of first cooling modules 114 coupled to a first thermally conductive base 116, and a plurality of second cooling modules 118 coupled to a second thermally conductive base 120. As a non-limiting example, the battery cells 112 may be prismatic lithium ion (Li-ion) battery cells. It should be appreciated that other battery cells, employing a different structure and electrochemistry, may also be used within the scope of the present invention.

Each of the battery cells 112 includes a plurality of battery components (not shown) co-acting between one another with electrolyte therebetween as known to those skilled in the lithium battery art. A first electrode is adjacent a first current collector and a second electrode of charge opposite the first electrode is adjacent a second current collector. A separator layer is positioned between the first and second electrodes with the first and second electrodes with electrolyte therebetween. A plurality of first electrodes and a plurality of second electrodes are stacked and packaged into an electrical insulating envelope to form the battery cells 112.

Interposed between the battery cells 112 are the cooling modules 114, 118. Each of the cooling modules 114, 118 includes a plurality of thermally conductive members 122 in stacked relation. In certain embodiments, the cooling modules 114, 118 include five (5) of the thermally conductive members 122 having a thickness in a range of about 0.1 mm to about 0.5 mm and a length in a range of about 80 mm to about 90 mm. However, it is understood that the cooling modules 114, 118 can include any number of the thermally conductive members 122 of any size and shape as desired. The thermally conductive members 122 can be plates, sheets, or foils formed from a thermally conductive material such as aluminum, copper, and the like, without limiting the scope of the present invention.

Each of the thermally conductive members 122 includes a first thermal transfer face 124, an opposing second thermal transfer face 126, and terminal ends 128, 130. The first thermal transfer face 124 of each of the thermally conductive members 122 abuts the second thermal transfer face 126 of the adjacent thermally conductive member 122 or a face of one of the battery cells 112. The second thermal transfer face 126 of each of the thermally conductive members 122 abuts the first thermal transfer face 124 of the adjacent thermally conductive member 122 or a face of one of the battery cells 112. As shown, the ends 128 of the thermally conductive members 122 of each of the cooling modules 114 are bonded together forming a fin portion 132. The ends 130 of the thermally conductive members 122 of each of the cooling modules 118 are bonded together forming a fin portion 134. In certain embodiments, the ends 128, 130 of the thermally conductive members 122 are bonded together by a welding process such as a diffusion welding process, an ultrasonic welding process, and the like, for example. It is understood, however, that the ends 128, 130 of the thermally conductive members 122 can be bonded together by any suitable process such as brazing, soldering, riveting, clamping, use of an adhesive, and the like, for example.

The fin portions 132, 134 shown are bendable tabs extending beyond the battery cells 112. In certain embodiments, each of the fin portions 132, 134 is generally planar having a length in a range of about 10 mm to about 30 mm. It is understood that the fin portions 132, 134 can have any shape and size as desired such as pleated, for example. As shown, the fin portions 132, 134 are directly affixed to the thermally conductive bases 116, 120, respectively, to provide a thermal flow path from the battery cells 112 to the thermally conductive bases 116, 120 without any thermal interface resistance. It is understood that the fin portions 132, 134 can be affixed to the thermally conductive bases 116, 120 by any suitable process such as welding, brazing, soldering, riveting, clamping, use of an adhesive, and the like, for example. Each of the fin portions 132, 134 may also include at least one aperture formed therein to facilitate affixing to the thermally conductive bases 116, 120. It is also understood that the fin portions 132, 134 can abut the thermally conductive bases 116, 120.

Figure 5A:
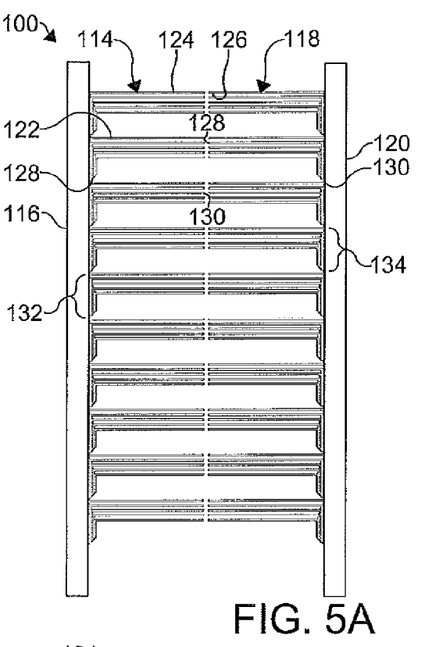
FIGS. 5A-5C are schematic elevational views depicting a method for assembling the battery assembly illustrated in FIG. 4.
Figure 5B:
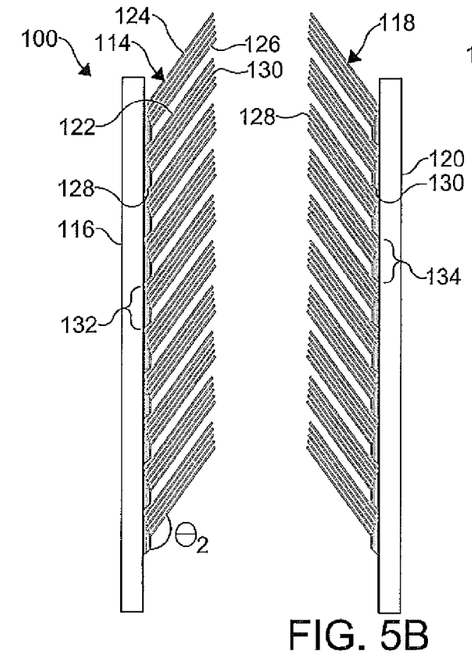
Figure 5C:
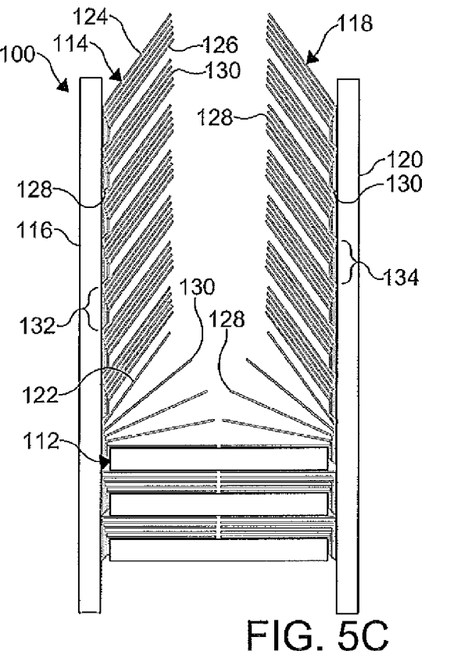
Figure 6A:
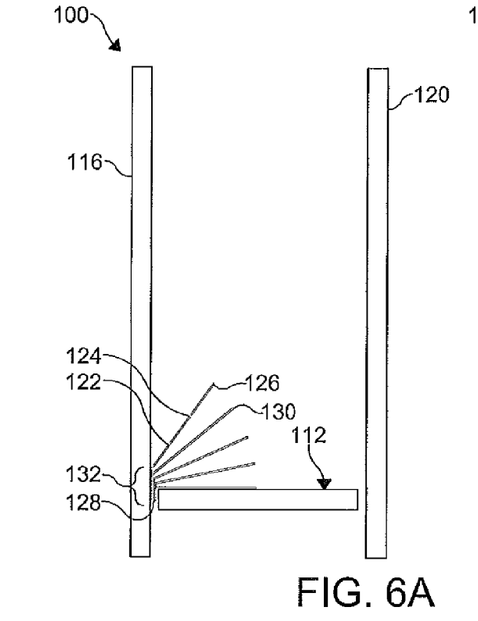
FIGS. 6A-6D are schematic elevational views depicting an alternate method for assembling the battery assembly illustrated in FIG. 4.
Figure 6B:
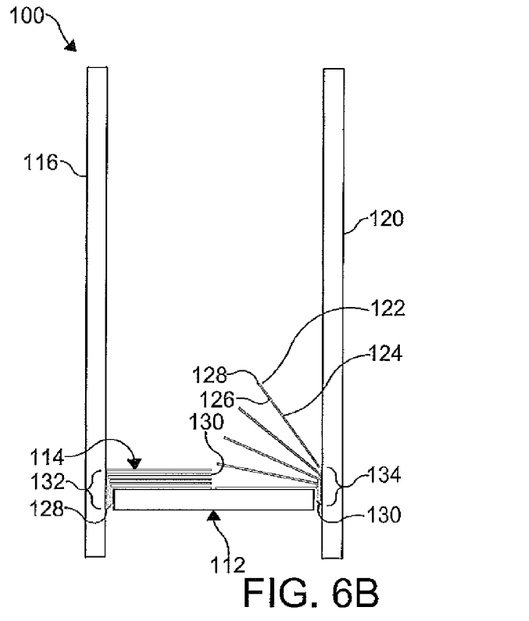
Figure 6C:
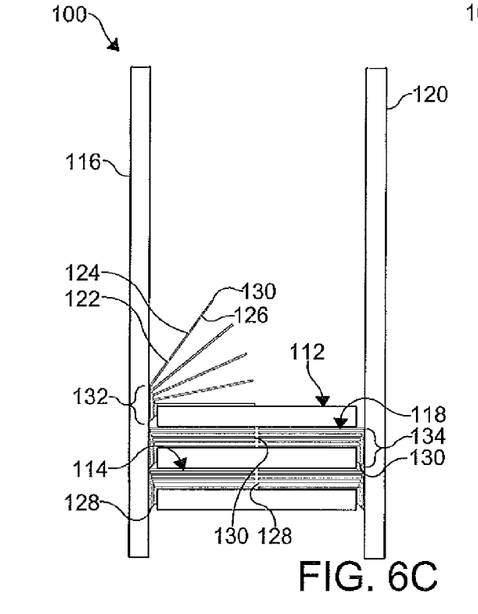
Figure 6D:
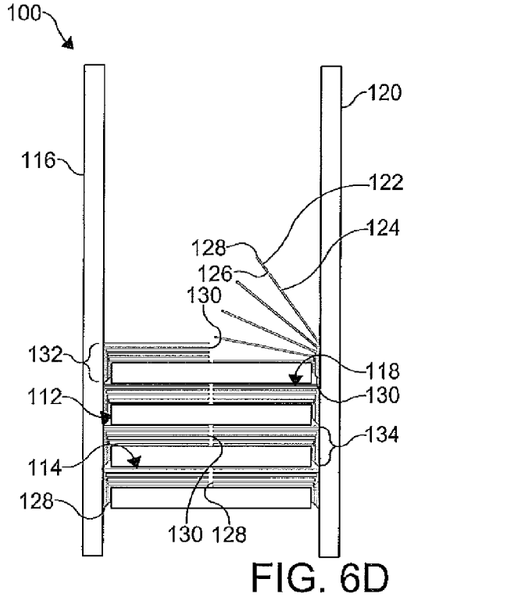

Referring to FIGS. 5A-5C, a method of assembling the battery assembly 100 is shown. The cooling modules 114, 118 are coupled to the respective thermally conductive bases 116, 120 in a substantially aligned manner. In other words, the cooling module 114 is substantially laterally aligned with respect of the cooling module 118 as shown in FIG. 5A. As illustrated, the cooling modules 114, 118 are coupled to the thermally conductive bases 116, 120 by directly affixing the fin portions 132, 134 of the cooling modules 114, 118 thereto. Each of the cooling modules 114, 118 is spaced apart to permit the battery cells 112 to be disposed therebetween. Thereafter, as illustrated in FIG. 5B, the cooling modules 114, 118 are bent in a first direction towards the thermally conductive bases 116, 120. In certain embodiments, an angle $\Theta_2$ between the fin portions 132, 134 and the remaining portion of the cooling modules 114, 118, respectively, is greater than 90 degrees. The battery cells 112 are then disposed between and in heat transfer relationship with the cooling modules 114, 118. As depicted in FIG. 5C, one of the battery cells 112 is disposed between the thermally conductive bases 116, 120. The adjacent cooling modules 114, 118 are then bent in a second direction away from the thermally conductive bases 116, 120 so that the angle $\Theta_2$ is about 90 degrees. Another one of the battery cells 112 is disposed between the cooling modules 114, 118 until the battery assembly 100 is complete. It is understood that once the battery assembly 100 is assembled, the battery assembly 100 can then be placed into an enclosure or housing.

FIGS. 6A-6D show an alternate method of assembling the battery assembly 100 according to the present invention. The method shown in FIGS. 6A-6D is substantially similar to the method shown in FIGS. 5A-5C, except that the cooling modules 114, 118 shown in FIGS. 6A-6D are directly affixed to or caused to abut the thermally conductive bases 116, 120 as the battery assembly 100 is being assembled.

Figure 7:
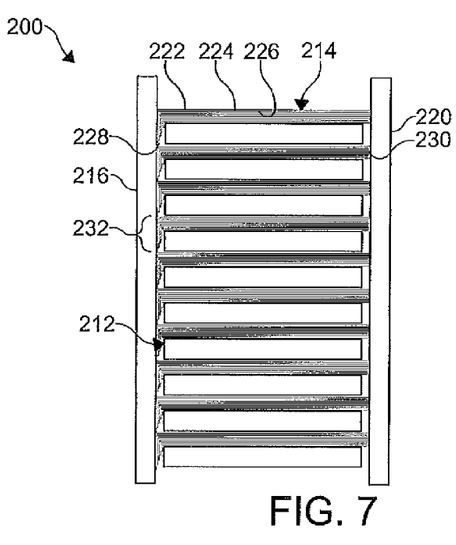
FIG. 7 is a schematic elevational view of a battery assembly according to another embodiment of the invention.

FIG. 7 shows a battery assembly 200 according to the present invention. The battery assembly 200 can be used in various configurations including, but not limited to, a horizontally or vertically stacked battery cell packaging configuration used in an automotive vehicle application. The battery assembly 200 shown includes a plurality of battery cells 212, a plurality of cooling modules 214 coupled to a first thermally conductive base 216, and a second thermally conductive base 220. It is understood that at least one of the cooling modules 214 can be coupled to the second thermally conductive base 220 if desired. As a non-limiting example, the battery cells 212 may be prismatic lithium ion (Li-ion) battery cells. It should be appreciated that other battery cells, employing a different structure and electrochemistry, may also be used within the scope of the present invention.

Each of the battery cells 212 includes a plurality of battery components (not shown) co-acting between one another with electrolyte therebetween as known to those skilled in the lithium battery art. A first electrode is adjacent a first current collector and a second electrode of charge opposite the first electrode is adjacent a second current collector. A separator layer is positioned between the first and second electrodes with the first and second electrodes with electrolyte therebetween. A plurality of first electrodes and a plurality of second electrodes are stacked and packaged into an electrical insulating envelope to form the battery cells 212.

Interposed between the battery cells 212 are the cooling modules 214. Each of the cooling modules 214 includes a plurality of thermally conductive members 222 in stacked relation. In certain embodiments, the cooling modules 214 include five (5) of the thermally conductive members 222 having a thickness in a range of about 0.1 mm to about 0.5 mm and a length in a range of about 160 mm to about 180 mm. However, it is understood that the cooling modules 214 can include any number of the thermally conductive members 222 of any size and shape as desired. The thermally conductive members 222 can be plates, sheets, or foils formed from a thermally conductive material such as aluminum, copper, and the like, without limiting the scope of the present invention.

Each of the thermally conductive members 222 includes a first thermal transfer face 224, an opposing second thermal transfer face 226, and terminal ends 228, 230. The first thermal transfer face 224 of each of the thermally conductive members 222 abuts the second thermal transfer face 226 of the adjacent thermally conductive member 222 or a face of one of the battery cells 212. The second thermal transfer face 226 of each of the thermally conductive members 222 abuts the first thermal transfer face 224 of the adjacent thermally conductive member 222 or a face of one of the battery cells 212. As shown, the ends 228 of the thermally conductive members 222 of each of the cooling modules 214 are bonded together forming a fin portion 232. In certain embodiments, the ends 228 of the thermally conductive members 222 are bonded together by a welding process such as a diffusion welding process, an ultrasonic welding process, and the like, for example. It is understood, however, that the ends 228 of the thermally conductive members 222 can be bonded together by any suitable process such as brazing, soldering, riveting, clamping, use of an adhesive, and the like, for example.

The fin portions 232 shown are bendable tabs extending beyond the battery cells 212. In certain embodiments, each of the fin portions 232 is generally planar having a length in a range of about 10 mm to about 30 mm. It is understood that the fin portions 232 can have any shape and size as desired such as pleated, for example. As shown, the fin portions 232 are directly affixed to the thermally conductive base 216 to provide a thermal flow path from the battery cells 212 to the thermally conductive base 216 without any thermal interface resistance. It is understood that the fin portions 232 can be affixed to the thermally conductive base 216 by any suitable process such as welding, brazing, soldering, riveting, clamping, use of an adhesive, and the like, for example. Each of the fin portions 232 may also include at least one aperture formed therein to facilitate affixing to the thermally conductive base 216. It is also understood that the fin portions 232 can abut the thermally conductive base 216.

Figure 8A:
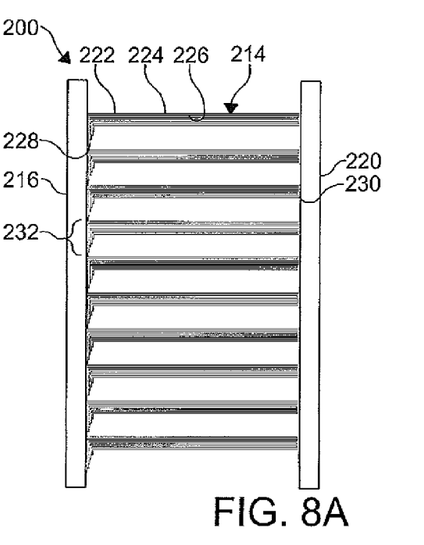
FIGS. 8A-8C are schematic elevational views depicting a method for assembling the battery assembly illustrated in FIG. 7.
Figure 8B:
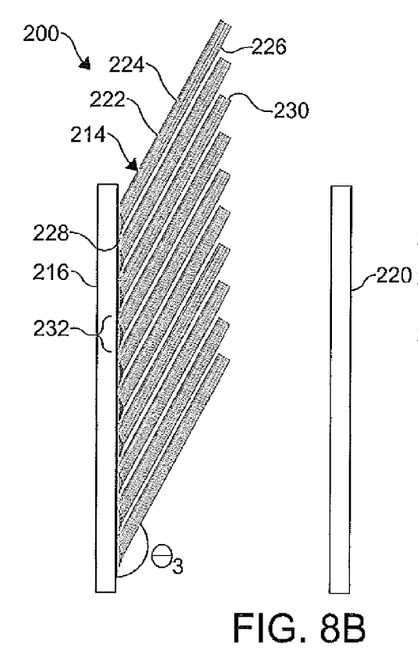
Figure 8C:
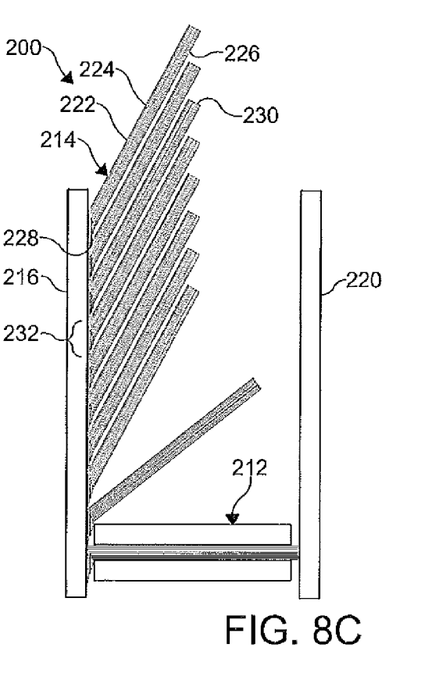
Figure 9A:
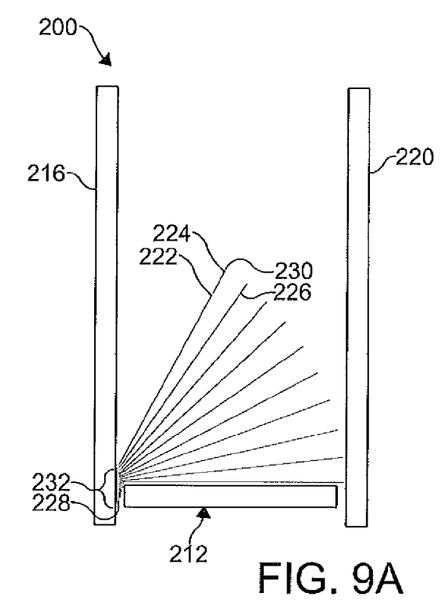
FIGS. 9A-9D are schematic elevational views depicting an alternate method for assembling the battery assembly illustrated in FIG. 7.
Figure 9B:
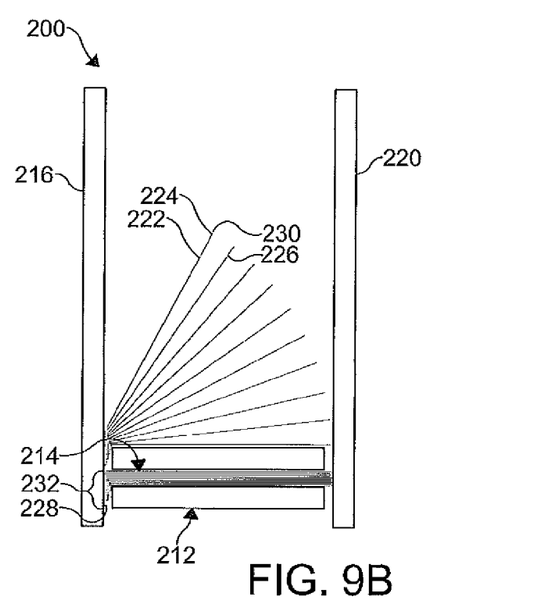
Figure 9C:
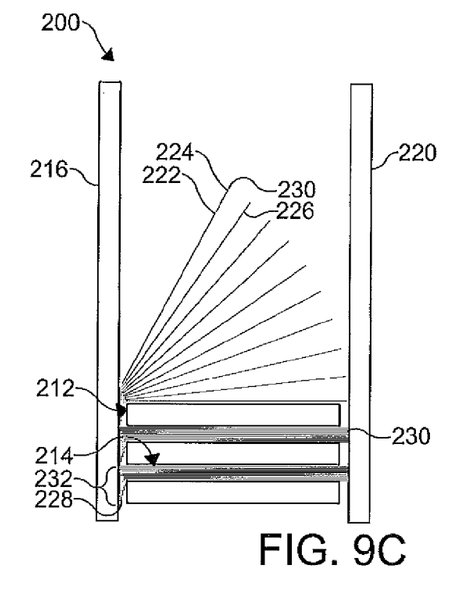
Figure 9D:
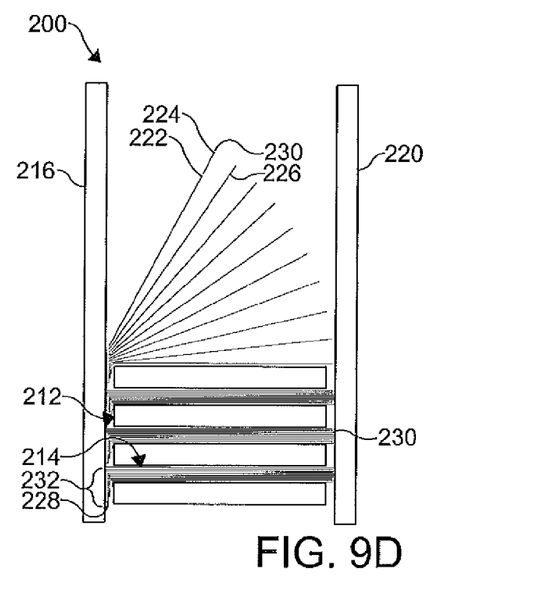

Referring to FIGS. 8A-8C, a method of assembling the battery assembly 200 is shown. The cooling modules 214 are coupled to the thermally conductive base 216. As illustrated, the cooling modules 214 are coupled to the thermally conductive base 216 by directly affixing the fin portions 232 of the cooling modules 214 thereto. Each of the cooling modules 214 is spaced apart to permit the battery cells 212 to be disposed therebetween. Thereafter, as illustrated in FIG. 8B, the cooling modules 214 are bent in a first direction towards the thermally conductive base 216. In certain embodiments, an angle $\Theta_3$ between the fin portions 232 and the remaining portion of the cooling modules 214 is greater than 90 degrees. The battery cells 212 are then disposed between and in heat transfer relationship with the cooling modules 214. As depicted in FIG. 8C, one of the battery cells 212 is disposed between the thermally conductive bases 216, 220. The adjacent cooling module 214 is then bent in a second direction away from the thermally conductive base 216 so that the angle $\Theta_2$ is about 90 degrees. Another one of the battery cells 212 is then disposed between the adjacent cooling modules 214 until the battery assembly 200 is complete. It is understood that once the battery assembly 200 is assembled, the battery assembly 200 can then be placed into an enclosure or housing.

FIGS. 9A-9D show an alternate method of assembling the battery assembly 200 according to the present invention. The method shown in FIGS. 9A-9D is substantially similar to the method shown in FIGS. 8A-8C, except that the cooling modules 214 shown in FIGS. 9A-9D are directly affixed to or caused to abut the thermally conductive base 216 as the battery assembly 200 is being assembled.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A battery assembly, comprising:
a thermally conductive base;
a plurality of cooling modules each directly abutting an inner surface of the thermally conductive base, wherein at least one of the cooling modules includes a plurality of thermally conductive members; and
at least one battery cell in heat transfer relationship with the cooling modules, the inner surface of the thermally conductive base in facing relationship with the at least one battery cell.

2. The battery assembly according to claim 1, wherein the at least one battery cell is disposed between two adjacent ones of the cooling modules.

3. The battery assembly according to claim 1, wherein at least one of the cooling modules is directly affixed to the inner surface of the thermally conductive base and extends in a direction away from the inner surface.

4. The battery assembly according to claim 1, wherein at least a portion of one of the thermally conductive members is bonded together with at least a portion of another one of the thermally conductive members of the at least one of the cooling modules to form a fin portion, the fin portion extending substantially parallel and directly affixed to the inner surface of the thermally conductive base.

5. The battery assembly according to claim 4, wherein each of the cooling modules includes a bend formed therein separating the fin portion from a remaining portion of each of the cooling modules, the remaining portion of each of the cooling modules extending away from the fin portion and the thermally conductive base in a direction transverse to a direction the fin portion extends, wherein a distal end of the remaining portion is free.

6. A battery assembly, comprising:
a first thermally conductive base including a first inner surface;
a second thermally conductive base including a second inner surface in facing relationship with the first inner surface;
a plurality of first cooling modules each directly abutting the first inner surface of the first thermally conductive base, wherein at least one of the first cooling modules includes a plurality of first thermally conductive members;
a plurality of second cooling modules directly abutting the second inner surface of the second thermally conductive base, wherein at least one of the second cooling modules includes a plurality of second thermally conductive members; and at least one battery cell disposed adjacent and in heat transfer relationship with the first and second cooling modules.

7. The battery assembly according to claim 6, wherein at least one of the first cooling modules is directly affixed to the first inner surface of the first thermally conductive base.

8. The battery assembly according to claim 6, wherein at least a portion of one of the first thermally conductive members is bonded together with at least a portion of another one of the first thermally conductive members to form a fin portion, the fin portion of the one of the first thermally conductive members extending substantially parallel and directly affixed to the first inner surface.

9. The battery assembly according to claim 7, wherein at least one of the second cooling modules is directly affixed to the second inner surface of the second thermally conductive base.

10. The battery assembly according to claim 8, wherein at least a portion of one of the second thermally conductive members is bonded together with at least a portion of another one of the second thermally conductive members to form a fin portion, the fin portion of the one of the second thermally conductive members extending substantially parallel and directly affixed to the second inner surface.

11. The battery assembly according to claim 6, wherein each of the first cooling modules is laterally offset with respect to each of the second cooling modules.

12. A method of assembling a battery assembly, comprising the step of:
disposing at least one battery cell adjacent and in heat transfer relationship with at least one of a plurality of cooling modules, wherein at least one of the cooling modules includes a plurality of thermally conductive members, and wherein each of the cooling modules are configured to be directly abutting an inner surface of a thermally conductive base, the inner surface of the thermally conductive base in facing relationship with the at least one battery cell when the at least one battery cell is in heat transfer relationship with the at least one of the plurality of cooling modules.

13. The method according to claim 12, further comprising the step of abutting the cooling modules directly to the at least one thermally conductive base prior to the step of disposing the at least one battery cell adjacent and in heat transfer relationship with the cooling modules.

14. The method according to claim 12, further comprising the step of abutting the cooling modules directly to the thermally conductive base as the battery assembly is assembled.

15. The method according to claim 12, further comprising the steps of:
positioning the cooling modules in a first direction towards the thermally conductive base; and
positioning the cooling modules in a second direction away from the first thermally conductive base.

16. The method according to claim 12, wherein at least one of the cooling modules is directly affixed to the inner surface of the thermally conductive base.

17. The method according to claim 12, further comprising the step of bonding together at least a portion of the thermally conductive members of each of the cooling modules.

18. The method according to claim 12, wherein one of the cooling modules is laterally offset with respect to another one of the cooling modules.

19. The battery assembly according to claim 1, wherein each of the thermally conductive members is formed from one of aluminum and copper.

20. The battery assembly according to claim 1, wherein the battery assembly comprises at least two battery cells, and wherein each of the cooling modules includes a first thermal transfer face and an opposing second thermal transfer face, and wherein a first one of the battery cells abuts the first thermal transfer face of a first one of the cooling modules, and a second one of the second battery cells abuts the second thermal transfer face of the first one of the cooling modules.

* * * * *